United States Patent
Chen et al.

(10) Patent No.: US 8,543,580 B2
(45) Date of Patent: Sep. 24, 2013

(54) MINING TRANSLATIONS OF WEB QUERIES FROM WEB CLICK-THROUGH DATA

(75) Inventors: Weizhu Chen, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 12/342,098

(22) Filed: Dec. 23, 2008

(65) Prior Publication Data

US 2010/0161642 A1    Jun. 24, 2010

(51) Int. Cl.
G06F 7/00 (2006.01)
G06F 17/30 (2006.01)

(52) U.S. Cl.
USPC .......................................................... 707/748

(58) Field of Classification Search
USPC .......................................... 707/748, 999.004
See application file for complete search history.

(56) References Cited

U.S. PATENT DOCUMENTS

| | | | |
|---|---|---|---|
| 5,321,607 A | 6/1994 | Fukumochi et al. | |
| 7,143,091 B2 | 11/2006 | Charnock et al. | |
| 7,430,528 B2 | 9/2008 | Perkowski | |
| 2003/0140307 A1 | 7/2003 | Bar-Yossef et al. | |
| 2006/0009963 A1* | 1/2006 | Gaussier et al. | 704/7 |
| 2006/0026496 A1 | 2/2006 | Joshi et al. | |
| 2006/0059132 A1 | 3/2006 | Zhang | |
| 2007/0022134 A1* | 1/2007 | Zhou et al. | 707/102 |
| 2007/0055656 A1 | 3/2007 | Tunstall-Pedoe | |
| 2008/0010056 A1* | 1/2008 | Zhou et al. | 704/8 |
| 2010/0070521 A1* | 3/2010 | Clinchant et al. | 707/760 |

OTHER PUBLICATIONS

Hu et al., "Mining Translations of Web Queries from Web Click-through Data," Jul. 13-17, 2008, 1144-1149 (retrieved from https://www.aaai.org/Papers/AAAI/2008/AAAI08-181.pdf ).*
Zhou, "Multilingual Web Retrieval: An Experiment on a Multilingual Business Intelligence Portal", Retrieved at, http://www.computer.org/portal/web/csdl/doi/10.1109/HICSS.2005.450, Proceedings of the 38th Hawaii ICSS—2005, Jan. 24, 2005, pp. 1-10.
Radev, "Evaluation of Text Summarization in a Cross-lingual Information Retrieval Framework", Retrieved at, http://tangra.si.umich.edu/~radev/papers/report.pdf, Summer 2001 Johns Hopkins Workshop Final Report, Aug. 16, 2001, pp. 1-135.

* cited by examiner

Primary Examiner — Aleksandr Kerzhner
(74) Attorney, Agent, or Firm — L. Alan Collins; Collins & Collins Intellectual, LLC

(57) ABSTRACT

Methods and technologies providing translations of web queries based on an analysis of user behavior in click-through data. These methods and technologies generates large-scale and timely query translation pairs guided by a small set of seed word pairs from a dictionary, without relying on additional knowledge or complex models.

20 Claims, 3 Drawing Sheets

MINING TRANSLATIONS OF WEB QUERIES FROM WEB CLICK-THROUGH DATA

BACKGROUND

Cross-Lingual Information Retrieval ("CLIR") has become increasingly important in Information Retrieval ("IR"), particularly given the advent and popularity of the Internet world-wide. When considering the Internet, one difference between CLIR and traditional IR is that the query language may differ from the page language, thus suggesting a focus on how to translate a source query into a target query in the page language. In addition to CLIR, query translation may also be useful for other applications, such as machine translation ("MT"), question answering, and reading/writing assistance.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide methods and technologies to provide translations of web queries based on an analysis of user behavior in click-through data. These methods and technologies generates large-scale and timely query translation pairs guided by a small set of seed word pairs from a dictionary, without relying on additional knowledge or complex models. The term "query translation pairs" and the like as used herein generally refers to two queries that have the same meaning but are expressed in different languages, such as English and Chinese. Examples herein generally use these methods and technologies to mine English-Chinese query translation pairs. However, the methods and technologies described do not consider any linguistic constraints, and hence may alternatively be applied to any language pairs.

Intuitively, millions of Internet users across the world daily issue queries to search engines in various languages, which form large-scale and live cross-lingual click-through data. This data represents rich user language knowledge about queries as well as their relationships to the clicked pages. Moreover, many universal resource locators ("URLs") in the click-through data contain some language information. Such language knowledge encoded in URLs may be leveraged to construct extensive bilingual URL pair patterns. One aspect of the example methods and technologies is to discover user behavior in the click-through data to mine URL pair patterns, and eventually generate query translation pairs.

The example methods and technologies benefit from two conditions, both of which have been experimentally verified based on the click-through data collected from a large commercial web search engine. The first condition is that there generally exists some naming convention in the URLs which specifies the language information of the corresponding pages, such as en-us, zh-cn, .cn, .us or the like. In one example, this was verified by first extracting English words and their corresponding Chinese translation words from an English-Chinese dictionary, obtaining 22,000 word translation pairs. Then collecting the URLs clicked by these words from the click-through data. Finally, among 99,900 distinct URLs clicked, 51,000 URLs (over 50%) were found by human judges to be encoded with language information. Consider the example shown in Table 1, the English URL is http://www.fedex.com/us/ and the corresponding Chinese URL is http://www.fedex.com/cn/. They share the common substring http://www.fedex.com/, and the only difference is the substring indicating the language type, i.e., us is used to indicate the English version, while cn is used to indicate the Chinese version. These two example URLs form a bilingual URL pair.

TABLE 1

| http://www.fedex.com/us/ | http://www.fedex.com/cn/ |
|---|---|
| fedex | 联邦快递 |
| express | 国际快递服务 |
| ... | ... |

The second condition is that generally the clicked URLs are relevant to the query from which they result. A clicked URL may provide the connection between URLs and queries, which can be exploited to extract candidate query pairs. In the above example, http://www.fedex.com/us/ can be considered to be relevant to English queries "fedex" and "express", whereas http://www.fedex.com/cn/ can be considered to be relevant to Chinese queries "联邦快递" and "国际快递服务", since users click the URLs after submitting the queries to the search engine. By employing various filtering strategies, we can extract query translation pair "fedex" and "联邦快递" from four candidate queries.

Given these two conditions, the example methods and technologies provided herein can generally be divided into two steps. The first step is typically to use a dictionary for finding seed queries to mine URL pair patterns from the click-through data. In one example, such seed queries may be obtained by mining the click-through data for a pair of queries that have a high frequency of occurrence and that have the same meaning according to a dictionary or the like. The second step is typically to use the mined URL pair patterns to generate the candidate query pairs. The resulting query pairs are typically generated based on co-occurrence analysis of the click-through data.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

Figure 1:
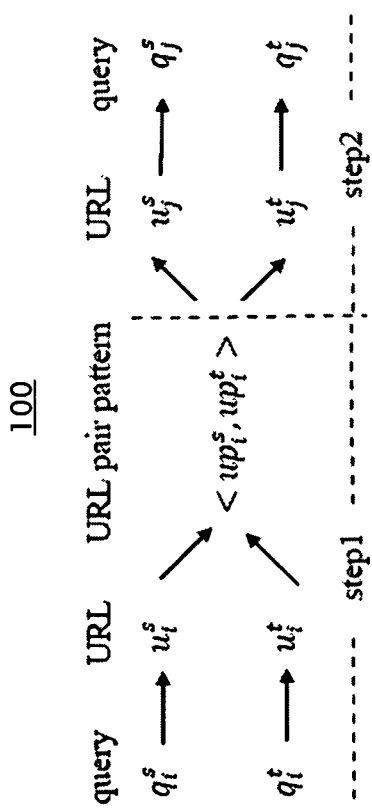
FIG. 1 is a block diagram showing an example method 100 providing an outline for performing query translation resulting in a query translation pair.

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing environment, the environment described is provided as an example and not a limitation. As those skilled in the art will appreciate, the present examples are suitable for application in a variety of different types of computing environments.

The term "query" as used herein generally refers to a word, words, or phrase entered by a user into a web browser or the like for the purpose of searching the Internet for information related to the query. For example, a user may wish to find the "FedEx" web site and so may enter the word "fedex" into the web browser. In this example, the word "fedex" represents the query. Given the world-wide nature of the Internet, it may be desirable to obtain a translation of a query in another language. The terms "query translation" and "query pair translation" as used herein generally refer to methods and technologies as described herein that result in a pair of queries where both queries in the pair have the same meaning but each query is represented in a different language. The term "query translation pair" ("QTP") as used herein generally refers to a pair of queries that have the same meaning but where each query is represented in a different language.

The terms "link" and "web link" as used herein typically refer to a URL or other reference to a body of information such as a web site or page(s) or the like. Such a body of information may additionally or alternatively include one or more files, images, videos, recordings, documents, presentations, further lists or rankings of links, real-time sessions, or any combination of the like. The terms "URL" and "link" and "page" and the like may be used synonymously herein for simplicity. The term "URL pair" as used herein typically refers to a pair of URLs that reference bodies of information that differ primary in their user language. For example, the http://www.fedex.com/us example URL refers to the English FedEx website intended for primarily English users while the http://www.fedex.com/cn example URL refers to the Chinese FedEx website intended primarily for Chinese users. Other than language, the specific differences between each of these websites may not be significant to any aspect of the present invention; rather the significance is the fact that users may consider the two websites to be essentially the same differing primarily in the user language supported.

The term "click-through" as used herein typically refers to a user clicking on a web link or the like, typically resulting from a query, and typically browsing to the web site or the like associated with the link. The term "click-through data" as used herein typically refers to data comprising a query (typically provided by a user), a ranking of links or the like (e.g., URLs) provided by a search engine to the user, and the set of links from the ranking that the user clicked on along with frequency data typically indicating the number of times a particular link or URL has been clicked.

FIG. 1 is a block diagram showing an example method 100 providing an outline for performing query translation resulting in a query translation pair. In general, a user u submits a query q in market m, and a search engine or the like typically returns a ranked list of links. The user then clicks page p. A "session" as typically used herein may be defined as <u, q, p, m>. Click-through data include the accumulation of data from a large number of such sessions. The term "market" (m) as used herein typically denotes the language of the query, such as English or Chinese for example. Note that market m may refer to any language; English and Chinese are used herein as examples only for simplicity in presentation and are not intended to be limitations.

Method 100 is shown in this example to be comprised of two major steps, step 1 and step 2. Step 1 typically begins with one or more seed query pairs (e.g., $<q_i^s, q_i^t>$), identifies their corresponding URL pairs (e.g., $<u_i^s, u_i^t>$), and generates URL pair patterns (e.g., $<up_i^s, up_i^t>$). Then step 2 typically begins by pairing up candidate queries relating to the URL pairs (e.g., $<u_j^s, u_j^t>$) that are extracted by URL pair patterns as query translation pairs (e.g., $<q_j^s, q_j^t>$).

Figure 2:
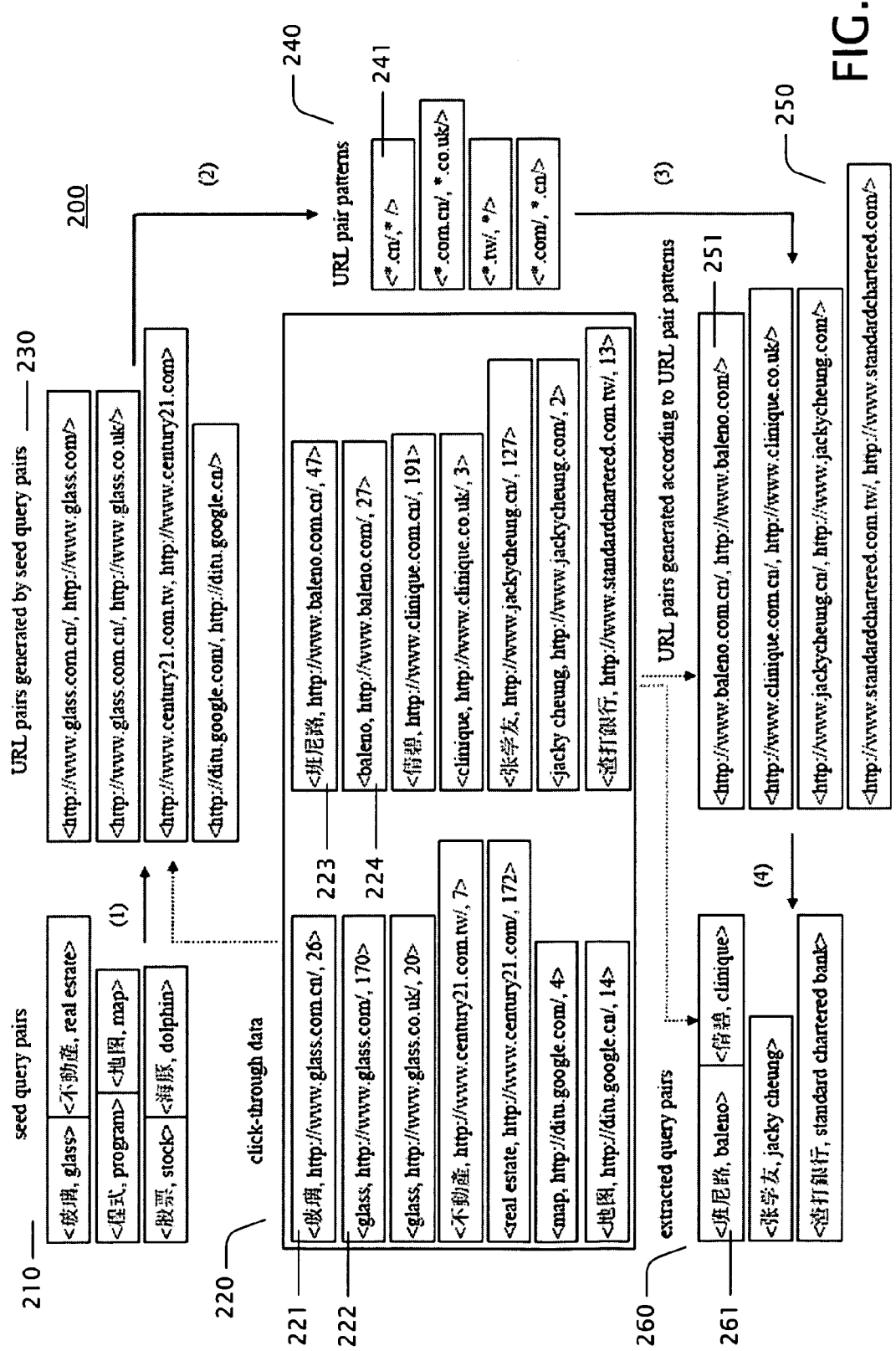
FIG. 2 is a block diagram showing an example of data flow using method 100.

FIG. 2 is a block diagram showing an example of data flow 200 using method 100. Seed query pairs 210 are typically query pairs taken at least in part from a bilingual dictionary or the like. For example, one query $q_i^s$ of a pair may be the word "glass" in English and the other query $q_i^t$ of the pair may be the Chinese translation for the English word "glass", as shown in example seed query pairs 210. In practice, seed query pairs can be obtained using any source of bilingual information including electronic or Internet bilingual dictionaries, human sources, etc.

Arrow (1) typically indicates finding relevant URL pairs from click-through data 220 related to seed query pairs 210. In one example, this finding is performed by identifying in the click-through data the URL for each query that is the most clicked from each of a seed query pair. As typically used herein, the most-clicked URL associated with each of any two such queries that have the same meaning (seed queries, for example) are together considered a "relevant URL pair". In the example shown, two groups of URL pairs 230 relevant to example seed query pairs 210 are found from example click-through data 220.

Arrow (2) typically indicates extracting URL pair patterns from the URL pairs. In the example, the similarity between URLs of URL pairs 230 is computed resulting in URL pair patterns 240. In one example, similarity is computed based on edit distance, which is generally a measure based on the minimum number of edit operations (insertion, deletion, substitution, etc.) required to transform one URL of a pair into the other. One advantage of using edit distance is that it tends to take into account both word order and the words themselves, thus making it suitable where on URL in a pair is often the substitution of the other in the same position. The similarity measure is typically inversely proportional to the ratio between edit distance and the length of the shorter URL in the URL pair:

$$sim(u_i^s, u_i^t) = 1 - \frac{EditDistance(u_i^s, u_i^t)}{\min(|u_i^s|, |u_i^t|)}$$

URL pairs with a similarity score above a particular threshold are typically chosen to extract URL pair patterns. For example, considering the URL pair of Table 1, the difference between the URLs is the 'us' and 'cn'. Thus the URL pair pattern <*.us, *.cn> can be identified and extracted. In one example, a largest common string algorithm is used to collect candidate patterns and the frequency of patterns is counted. In this example, patterns with a frequency larger than two are selected. Other filtering techniques for reducing or removing noise may additionally or alternatively be employed. As an illustration, example URL pattern pairs 240 where identified and extracted from example URL pairs 230.

URL pair patterns are typically used to guide URL extraction from click-through data. That is, bilingual URL pairs in the click-through data that correspond to URL pair patterns are selected as indicated by arrow (3). For example, the URLs of click-through data 221 and 222 represent a bilingual URL pair identified by URL pair pattern 241. The URLs of click-through data 223 and 224 also represent a bilingual URL pair identified by URL pair pattern 241. Other example bilingual URL pairs in example click-through data 220 may also be identifiable using example URL pair patterns 240. In general, a bilingual URL pair follows the pattern identified by the URL pair pattern.

Once bilingual URL pairs are extracted from click-through data, such as example click-through data 220, candidate query pairs in the click-through data corresponding to these bilingual URL pairs can be identified. In one example, such identification is based on the second condition described herein above, which is that generally clicked URLs are relevant to the query from which they result. For example, candidate query pair 261 corresponds to bilingual URL pair 251 as indicated by click-through data 223 and 224. In particular, the first URL of pair 251 corresponds to the URL of click-through data 223, the query of click-through data 223 thus becoming the first query of pair 261; and the second URL of pair 251 corresponds to the URL of click-through data 224, the query of click-through data 224 thus becoming the second query of pair 261. In general, a candidate query pair is formed using the queries of a click-through data pair in which the URL of each of the click-through data pair matches a unique one of the URLs of a particular bilingual URL pair. Due to noise in the click-through data some queries in candidate query pairs may be only loosely related. Thus, to generate query translation pairs, filtering of the candidate query pairs may be required. The term "noise" as used herein typically refers to clicked URLs associated with a particular query wherein the clicked-URL may be random or otherwise be unrelated or loosely related to the particular query. Thus, a "noisy" clicked-URL is a URL resulting from a query that is subsequently selected by a user but that does not correlate with the query.

In one example of such filtering, consider query $q_i^s$ in the source language, and query $q_i^t$ in the target language. If both $q_i^s$ and $q_i^t$ occur frequently in the candidate query pairs associated with the same bilingual URL pairs, then there may be a high probability that $q_i^s$ and $q_i^t$ are a translation of each other. However, co-occurrence alone may not be an accurate indicator of the probability that $q_i^s$ and $q_i^t$ are a translation of each other. For example, if query $q_i^s$ is also associated with other bilingual URL pairs with queries other than $q_i^t$, then query $q_i^t$ may have a lower probability of being a translation of query $q_i^s$. Accordingly, in one example a confidence score may be used to measure the extent to which two queries are relevant:

$$\text{score}(\langle q_i^s, q_i^t \rangle) = \frac{f(q_i^s, u_i^s) \times f(q_i^t, u_i^t)}{f(u_i^s) \times f(u_i^t) \times f(q_i^s) \times f(q_i^t)}$$

where $f(q_i^s, u_i^s)(f(q_i^t, u_i^t))$ represents the frequency or number of sessions in which the query is clicked such that the URL appears in the bilingual URL pair, and where $f(q_i^s)(f(q_i^t))$ is the frequency or number of sessions that contain $q_i^s(q_i^t)$, and where $f(u_i^s)(f(u_i^t))$ is the number of sessions that contain $u_i^s(u_i^t)$.

Accordingly, if two queries closely associate with a bilingual URL pair, and they frequently co-occur relative to their individual occurrence in candidate query pairs, then there is a high probability as indicated by the confidence score that they are translations of each other. That is, the two queries for a query translation pair. In one example, only candidate query pairs with large scores pass through the filtering step to be considered query translation pairs as indicated by arrow (4).

Further processing of query translation pairs may also be preformed. In one example, the translations of the query translation pair can be compared using a dictionary. But query translation pairs that according to the dictionary are not strict translations may be semantically relevant to each other and thus useful in improving CLIR. In another example, additional URL pair patterns may be extracted from query translation pairs and the process repeated.

Figure 3:
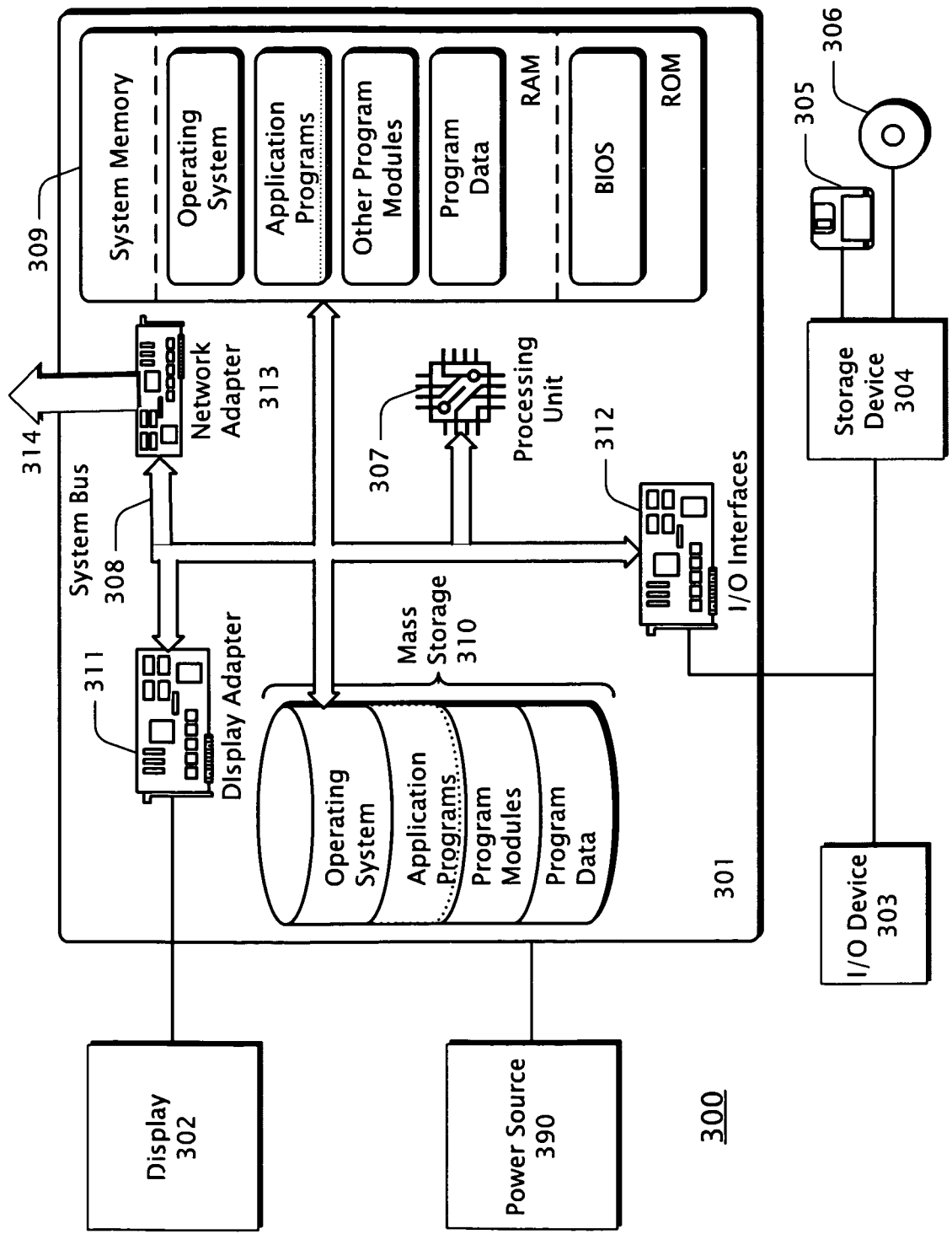
FIG. 3 is a block diagram showing an example computing environment in which the technologies and method described herein may be implemented.

FIG. 3 is a block diagram showing an example computing environment 300 in which the technologies and method described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 300 typically includes a general-purpose computing system in the form of a computing device 301 coupled to various components, such as peripheral devices 302, 303, 304 and the like. System 300 may couple to various other components, such as input devices 303, including voice recognition, touch pads, buttons, keyboards and/or pointing devices, such as a mouse or trackball, via one or more input/output ("I/O") interfaces 312. The components of computing device 301 may include one or more processors (including central processing units ("CPU"), graphics processing units ("GPU"), microprocessors ("µP"), and the like) 307, system memory 309, and a system bus 308 that typically couples the various components. Processor 307 typically processes or executes various computer-executable instructions to control the operation of computing device 301 and to communicate with other electronic and/or computing devices, systems or environment (not shown) via various communications connections such as a network connection 314 or the like. System bus 308 represents any number of several types of bus structures, including a memory bus or memory controller, a peripheral bus, a serial bus, an accelerated graphics port, a processor or local bus using any of a variety of bus architectures, and the like.

System memory 309 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 309 typically stores data, computer-executable instructions and/or program modules comprising computer-executable instructions that are immediately accessible to and/or presently operated on by one or more of the processors 307.

Mass storage devices 304 and 310 may be coupled to computing device 301 or incorporated into computing device 301 via coupling to the system bus. Such mass storage devices 304 and 310 may include non-volatile RAM, a magnetic disk drive which reads from and/or writes to a removable, non-volatile magnetic disk (e.g., a "floppy disk") 305, and/or an optical disk drive that reads from and/or writes to a non-volatile optical disk such as a CD ROM, DVD ROM 306. Alternatively, a mass storage device, such as hard disk 310, may include non-removable storage medium. Other mass storage devices may include memory cards, memory sticks, tape storage devices, and the like.

Any number of computer programs, files, data structures, and the like may be stored in mass storage 310, other storage devices 304, 305, 306 and system memory 309 (typically limited by available space) including, by way of example and not limitation, operating systems, application programs, data files, directory structures, computer-executable instructions, and the like.

Output components or devices, such as display device 302, may be coupled to computing device 301, typically via an interface such as a display adapter 311. Output device 302 may be a liquid crystal display ("LCD"). Other example output devices may include printers, audio outputs, voice outputs, cathode ray tube ("CRT") displays, tactile devices or other sensory output mechanisms, or the like. Output devices may enable computing device 301 to interact with human operators or other machines, systems, computing environments, or the like. A user may interface with computing environment 300 via any number of different I/O devices 303 such as a touch pad, buttons, keyboard, mouse, joystick, game pad, data port, and the like. These and other I/O devices may be coupled to processor 307 via I/O interfaces 312 which may be coupled to system bus 308, and/or may be coupled by other interfaces and bus structures, such as a parallel port, game port, universal serial bus ("USB"), fire wire, infrared ("IR") port, and the like.

Computing device 301 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 301 may be coupled to a network via network adapter 313 or the like, or, alternatively, via a modem, digital subscriber line ("DSL") link, integrated services digital network ("ISDN") link, Internet link, wireless link, or the like.

Communications connection 314, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 390, such as a battery or a power supply, typically provides power for portions or all of computing environment 300. In the case of the computing environment 300 being a mobile device or portable device or the like, power source 390 may be a battery. Alternatively, in the case computing environment 300 is a desktop computer or server or the like, power source 390 may be a power supply designed to connect to an alternating current ("AC") source, such as via a wall outlet.

Some mobile devices may not include many of the components described in connection with FIG. 3. For example, an electronic badge may be comprised of a coil of wire along with a simple processing unit 307 or the like, the coil configured to act as power source 390 when in proximity to a card reader device or the like. Such a coil may also be configure to act as an antenna coupled to the processing unit 307 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 302, I/O device 303, or many of the other components described in connection with FIG. 3. Other mobile devices that may not include many of the components described in connection with FIG. 3, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method performed on a computing device and for generating a query translation pair, the method comprising:

establishing a plurality of seed query pairs that each comprise a source language query and a target language query that have the same meaning but are in different languages, where the source language query is different for each of the plurality of seed query pairs;

finding a plurality of URL pairs from click-through data, the plurality of URL pairs based on the seed query pair;

extracting URL pair patterns from ones of the plurality of URL pairs having a similarity score above a particular threshold;

extracting from the click-through data bilingual URL pairs identified by the URL pair patterns;

identifying in the click-through data candidate query pairs corresponding to the bilingual URL pairs; and filtering the candidate query pairs based on a confidence score resulting in a query translation pair where queries of the query translation pair are translations of each other.

2. The method of claim 1 wherein the similarity score is calculated as $$sim(u_i^s, u_i^t) = 1 - \frac{EditDistance(u_i^s, u_i^t)}{\min(|u_i^s|, |u_i^t|)}$$

where $u_i^s$ represents a first URL corresponding to the source language query, where $u_i^t$ represents a second URL corresponding to the target language query, where the EditDistance( ) function contributes to the similarity score based on a minimum number of edit operations required to transform a first URL into a second URL, and where the min( ) function selects a shorter of the first and second URLs.

3. The method of claim 1 wherein the seed query pair is taken least in part from a bilingual dictionary.

4. The method of claim 1 wherein each of the plurality of URL pairs is found by identifying the most-clicked URL associated with each query of one of the plurality of seed query pairs.

5. The method of claim 1 wherein the extracted bilingual URL pairs follow at least one pattern identified by the URL pair patterns.

6. The method of claim 1 wherein a candidate query pair of the candidate query pairs is formed using queries of a click-through data pair in which a URL of each of the click-through data pair matches a unique one of another URL of a particular bilingual URL pair of the bilingual URL pairs.

7. The method of claim 1 wherein the filtering removes noisy candidate query pairs.

8. At least one computer storage device storing computer-executable instructions that, when executed by a computing device, cause the computing device to perform actions for generating a query translation pair, the actions comprising:
  establishing a plurality of seed query pairs that each comprise a source language query and a target language query that have the same meaning but are in different languages, where the source language query is different for each of the plurality of seed query pairs;
  finding a plurality of URL pairs from click-through data, the plurality of URL pairs based on the seed query pair;
  extracting URL pair patterns from ones of the plurality of URL pairs having a similarity score above a particular threshold;
  extracting from the click-through data bilingual URL pairs identified by the URL pair patterns;
  identifying in the click-through data candidate query pairs corresponding to the bilingual URL pairs; and
  filtering the candidate query pairs based on a confidence score resulting in a query translation pair where queries of the query translation pair are translations of each other.

9. The at least one computer storage device of claim 8 where the similarity score is calculated as $$sim(u_i^s, u_i^t) = 1 - \frac{EditDistance(u_i^s, u_i^t)}{\min(|u_i^s|, |u_i^t|)}$$

where $u_i^s$ represents a first URL corresponding to the source language query where $u_i^t$ represents a second URL corresponding to the target language query, where the EditDistance( ) function results in the similarity score based on a minimum number of edit operations required to transform a first URL into a second URL, and where the min( ) function selects a shorter of the first and second URLs.

10. The at least one computer storage device of claim 8 where the seed query pair is taken least in part from a bilingual dictionary.

11. The at least one computer storage device of claim 8 where each of the plurality of URL pairs is found by identifying the most-clicked URL associated with each query of one of the plurality of seed query pairs.

12. The at least one computer storage device of claim 8 where the extracted bilingual URL pairs follow at least one pattern identified by the URL pair patterns.

13. The at least one computer storage device of claim 8 where a candidate query pair of the candidate query pairs is formed using queries of a click-through data pair in which a URL of each of the click-through data pair matches a unique one of another URL of a particular bilingual URL pair of the bilingual URL pairs.

14. A computing device and at least one software module together configured for generating a query translation pair based on:
  establishing a plurality of seed query pairs that each comprise a source language query and a target language query that have the same meaning but are in different languages, where the source language query is different for each of the plurality of seed query pairs;
  finding a plurality of URL pairs from click-through data, the plurality of URL pairs based on the seed query pair;
  extracting URL pair patterns from ones of the plurality of URL pairs having a similarity score above a particular threshold;
  extracting from the click-through data bilingual URL pairs identified by the URL pair patterns;
  identifying in the click-through data candidate query pairs corresponding to the bilingual URL pairs; and
  filtering the candidate query pairs based on a confidence score resulting in a query translation pair where queries of the query translation pair are translations of each other.

15. The computing device and at least one software module of claim 14 where the similarity score is calculated as $$sim(u_i^s, u_i^t) = 1 - \frac{EditDistance(u_i^s, u_i^t)}{\min(|u_i^s|, |u_i^t|)}$$

where $u_i^s$ represents a first URL corresponding to the source language query, where $u_i^t$ represents a second URL corresponding to the target language query, where the EditDistance( ) function contributes to the similarity score based on a minimum number of edit operations required to transform a first URL into a second URL, and where the min( ) function selects a shorter of the first and second URLs.

16. The computing device and at least one software module of claim 14 where the seed query pair is taken least in part from a bilingual dictionary.

17. The computing device and at least one software module of claim 14 where each of the plurality of URL pairs is found by identifying the most-clicked URL associated with each query of one of the plurality of seed query pairs.

18. The computing device and at least one software module of claim 14 where the extracted bilingual URL pairs follow at least one pattern identified by the URL pair patterns.

19. The computing device and at least one software module of claim 14 where a candidate query pair of the candidate query pairs is formed using queries of a click-through data pair in which a URL of each of the click-through data pair matches a unique one of another URL of a particular bilingual URL pair of the bilingual URL pairs.

20. The computing device and at least one software module of claim 14 where the filtering removes noisy candidate query pairs.

* * * * *